March 8, 1932.   R. J. PARDEE   1,849,027
BRIQUETTING MACHINE
Filed March 27, 1931   17 Sheets-Sheet 1
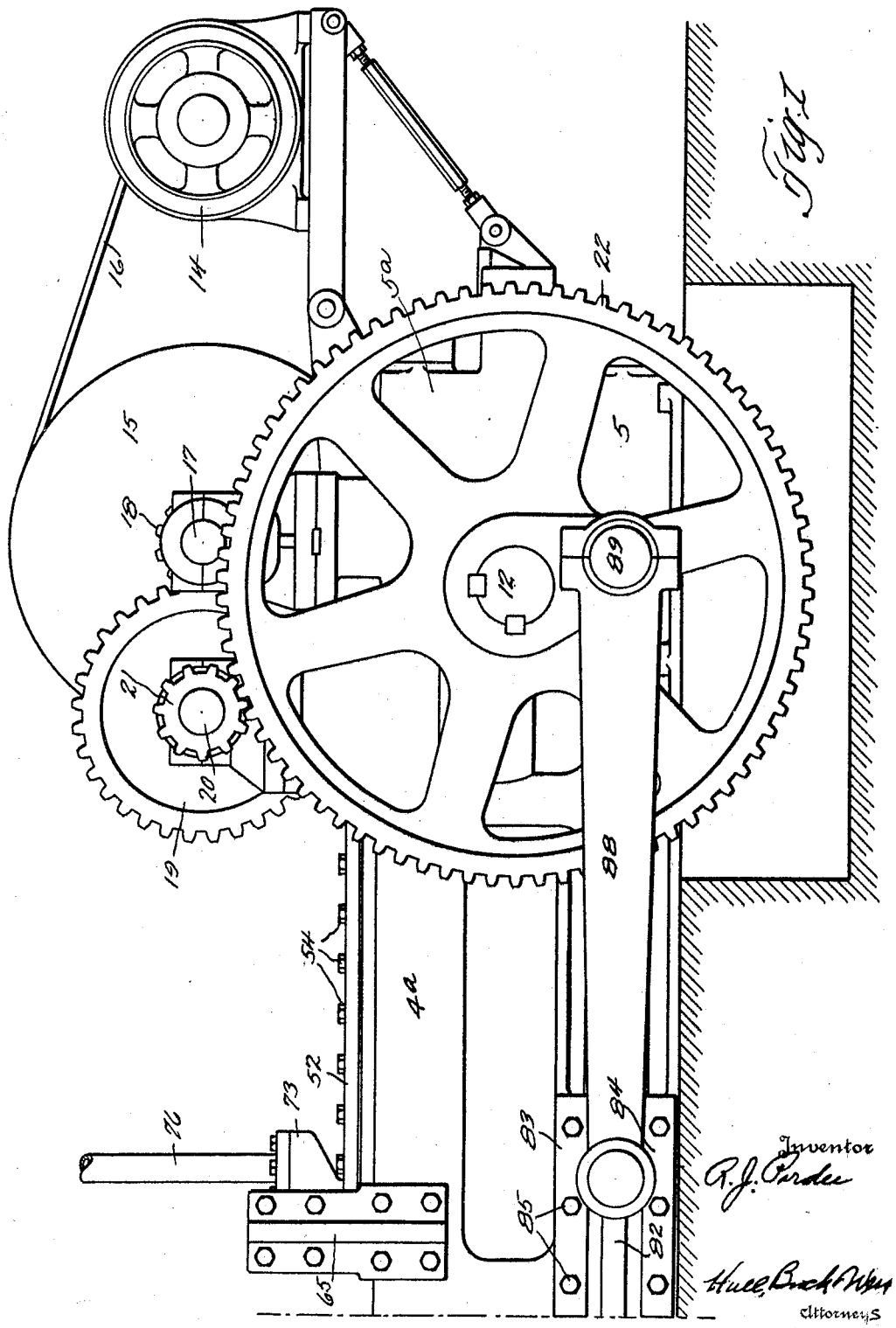

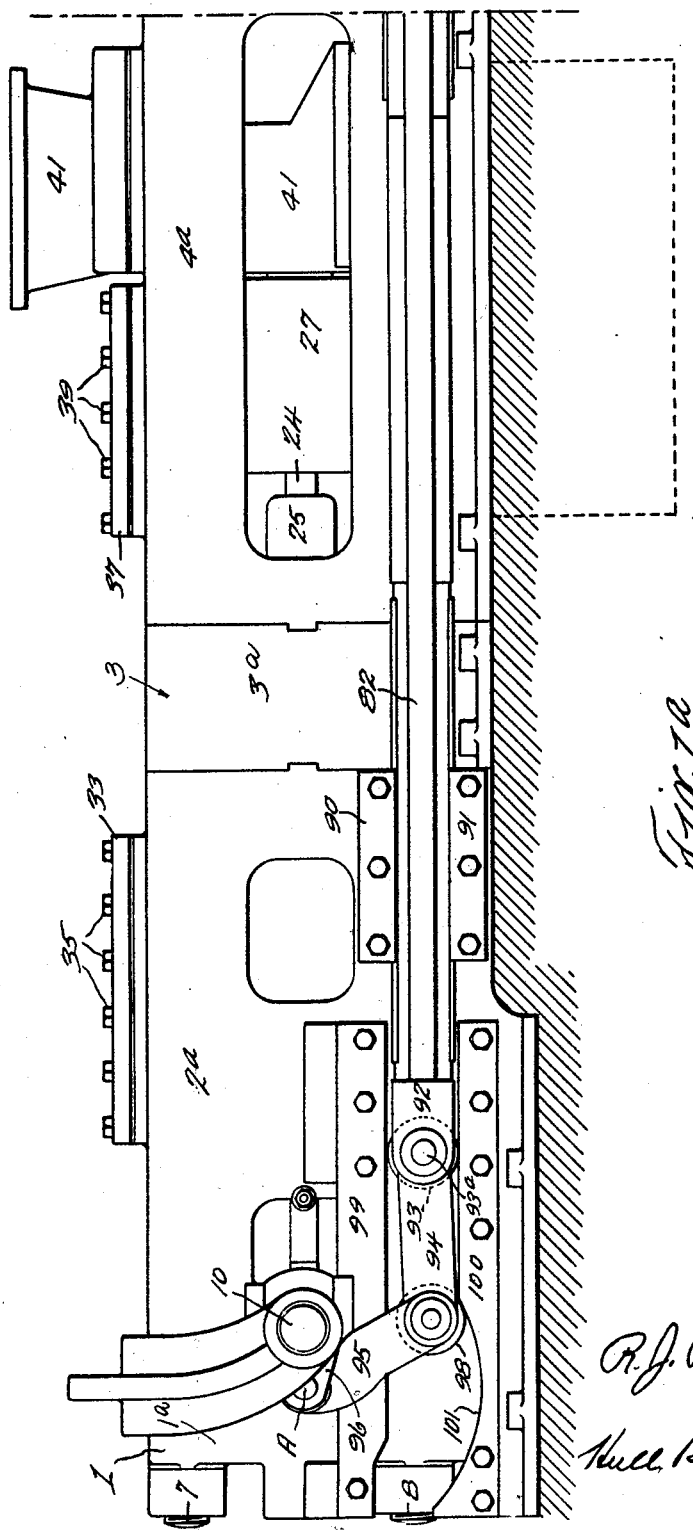

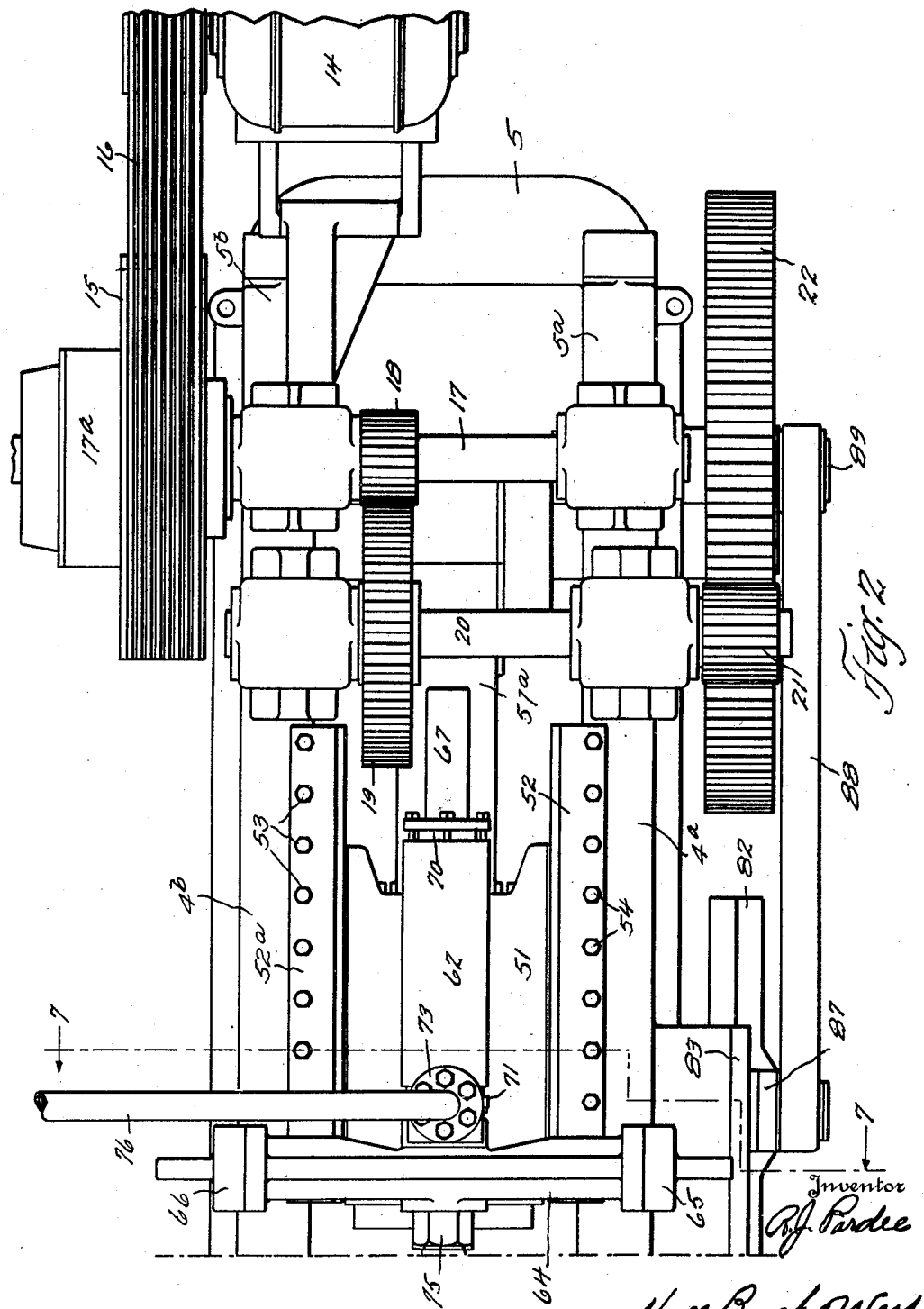

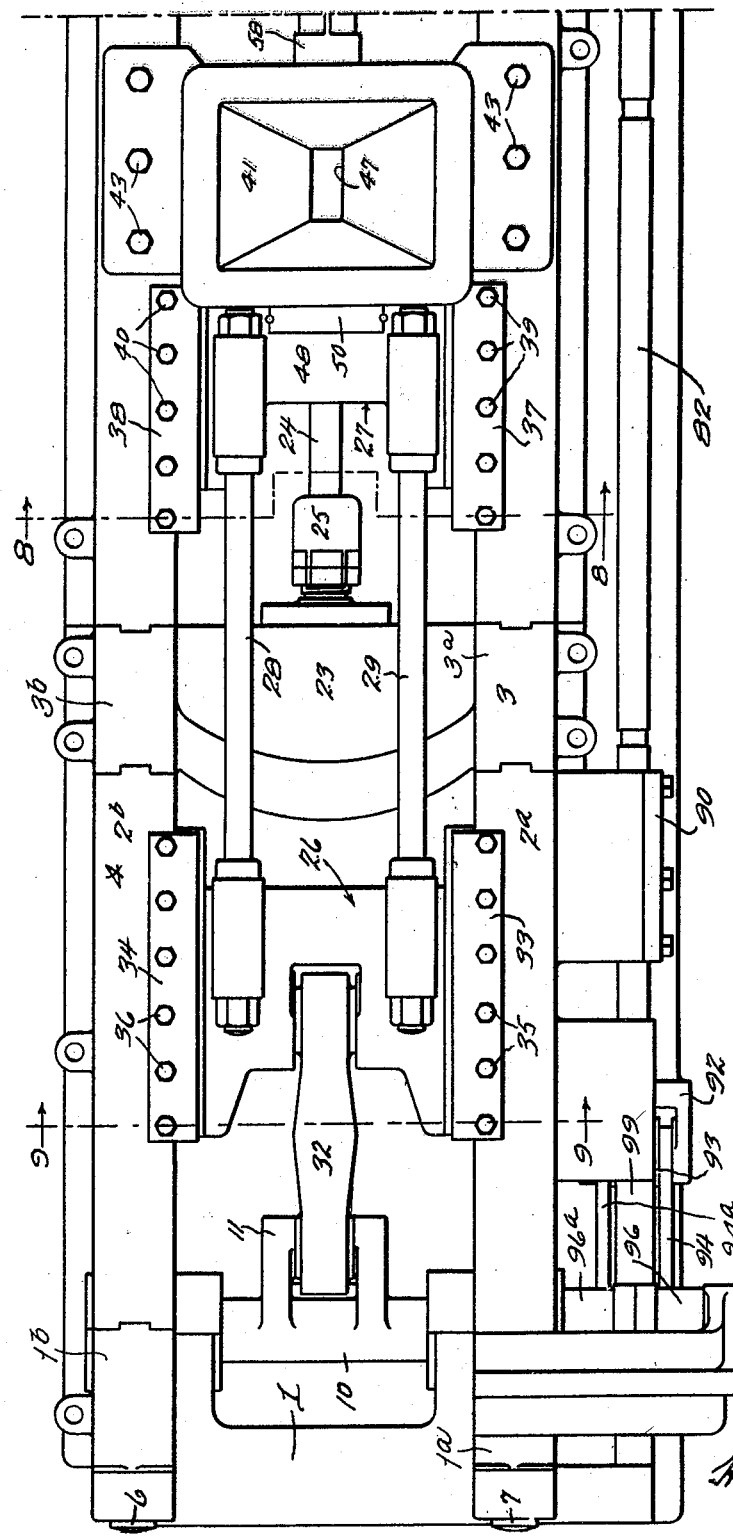

March 8, 1932.  R. J. PARDEE  1,849,027
BRIQUETTING MACHINE
Filed March 27, 1931  17 Sheets-Sheet 5

Inventor
R. J. Pardee
Hull, Brock & West
Attorneys

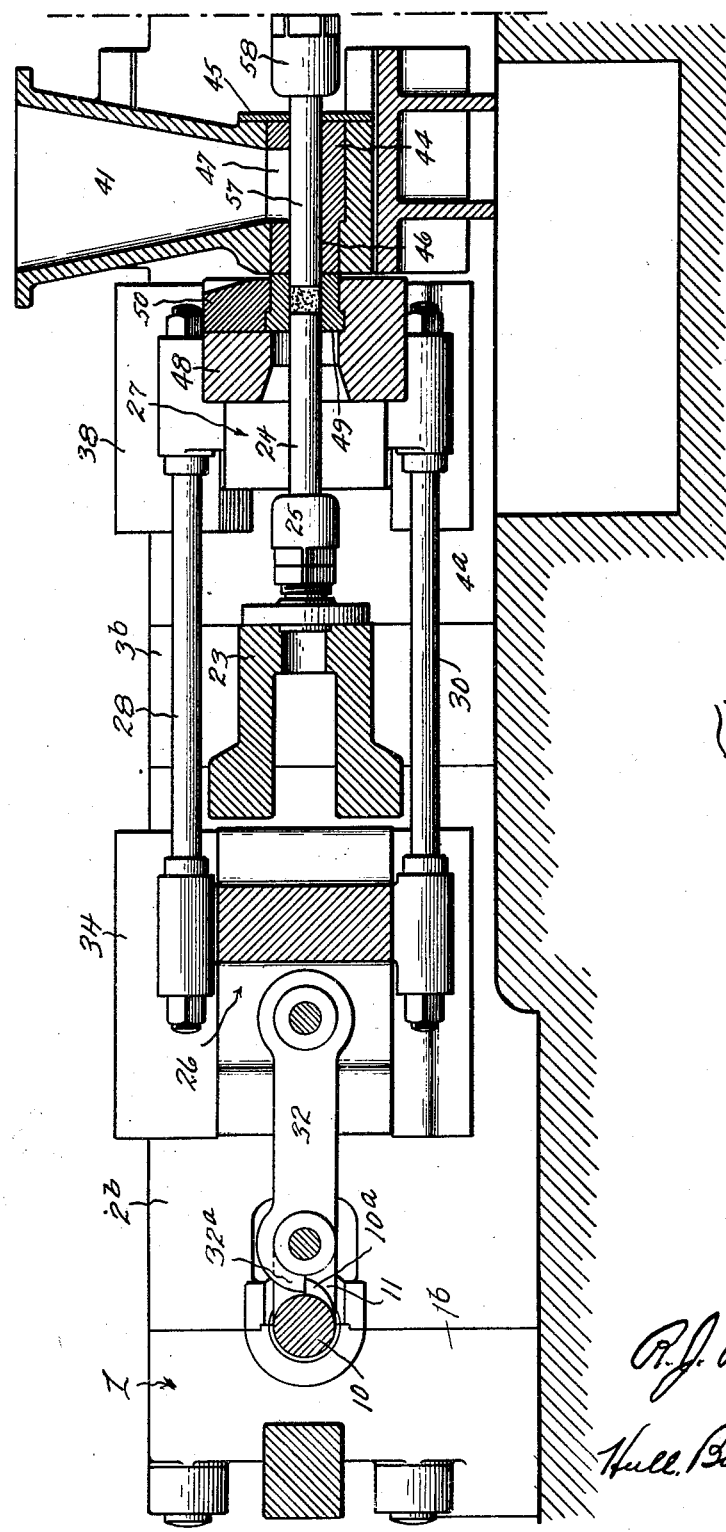

March 8, 1932. R. J. PARDEE 1,849,027
BRIQUETTING MACHINE
Filed March 27, 1931 17 Sheets-Sheet 7

Inventor
R. J. Pardee
Hull, Brock & West
Attorneys

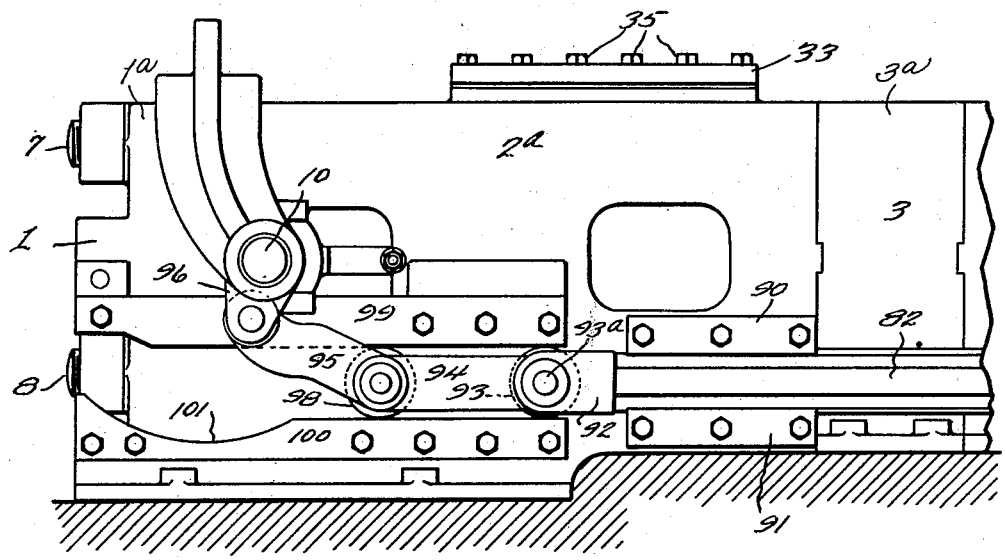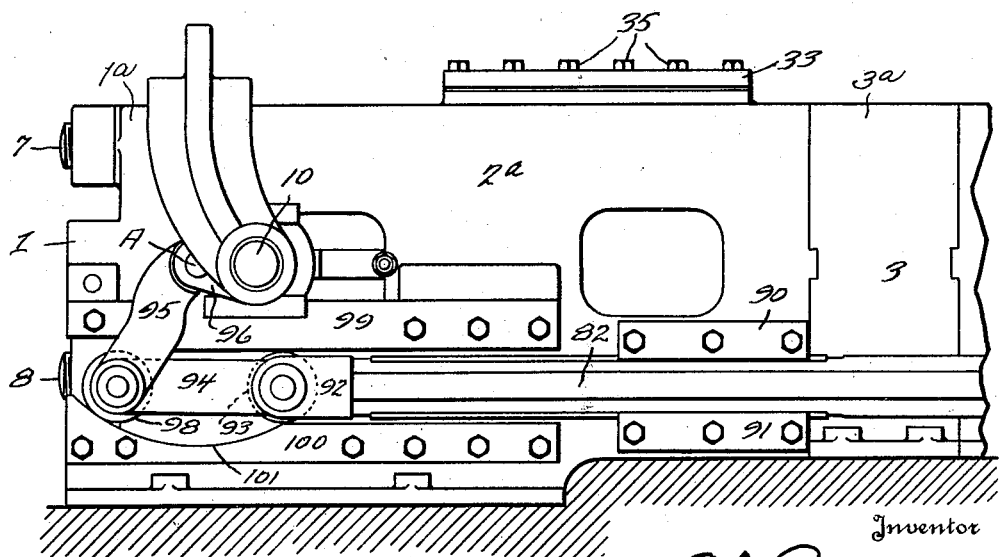

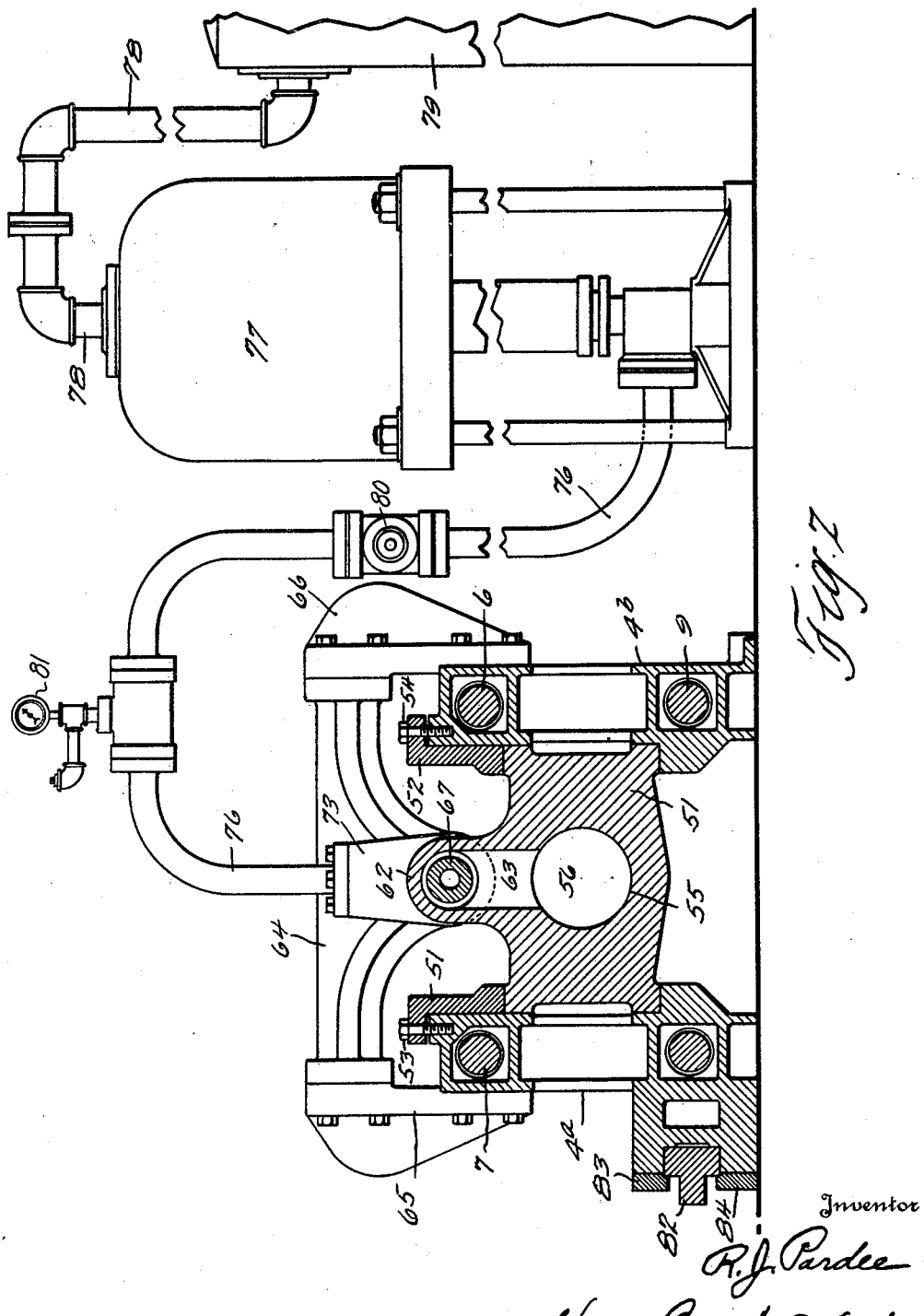

March 8, 1932. R. J. PARDEE 1,849,027
BRIQUETTING MACHINE
Filed March 27, 1931 17 Sheets-Sheet 11

Inventor
R. J. Pardee
By Hull, Buck & West
Attorneys

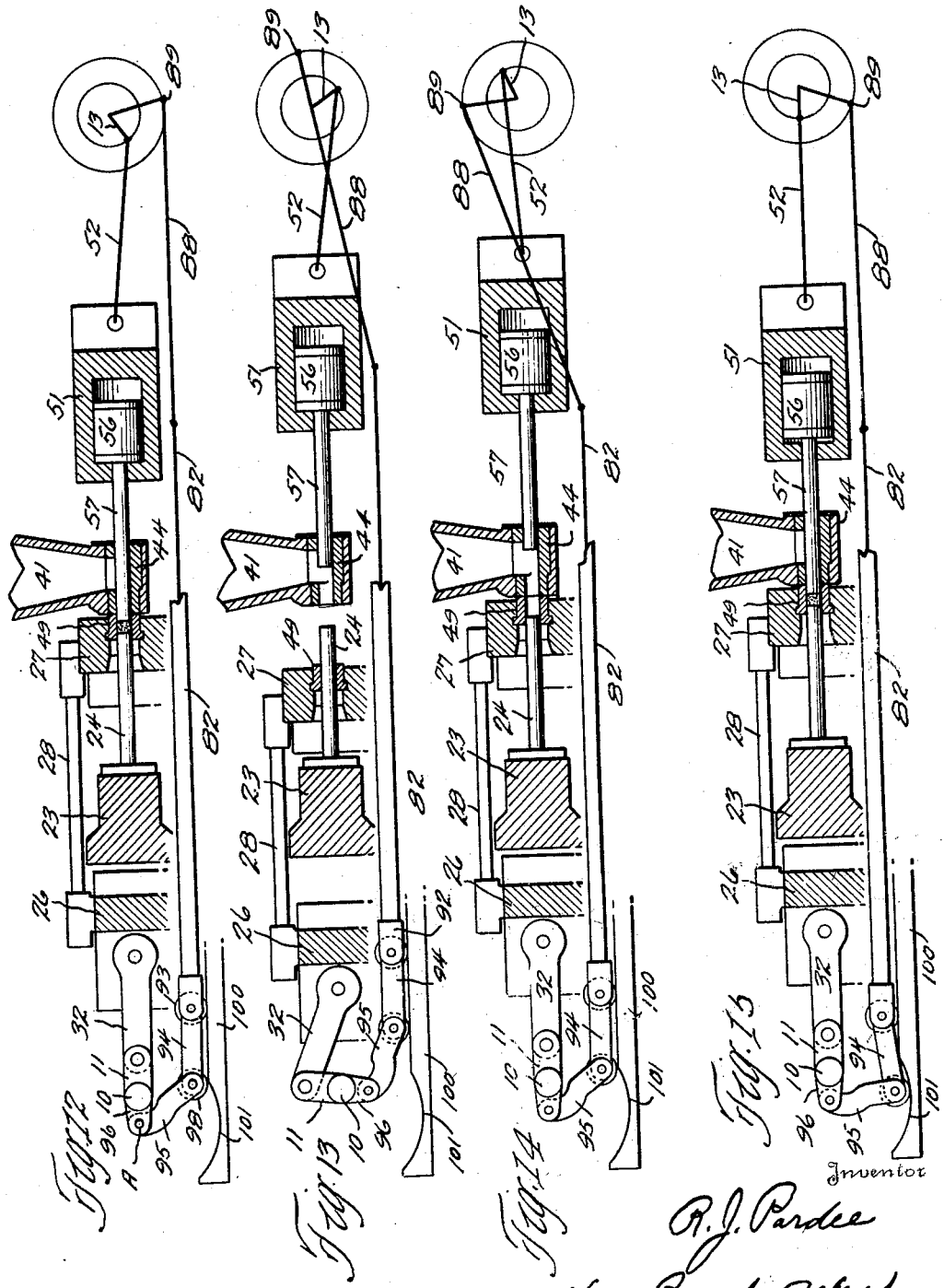

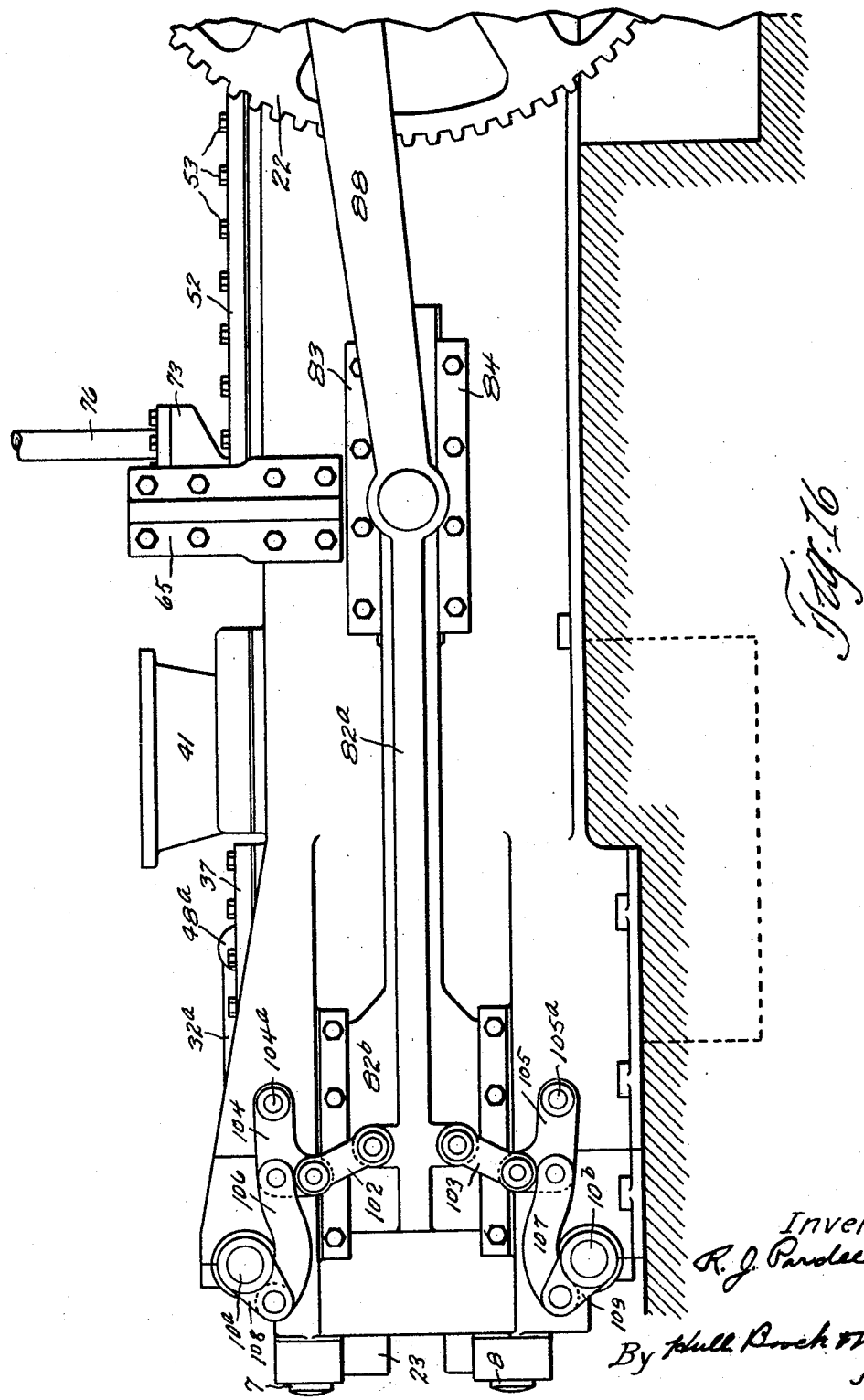

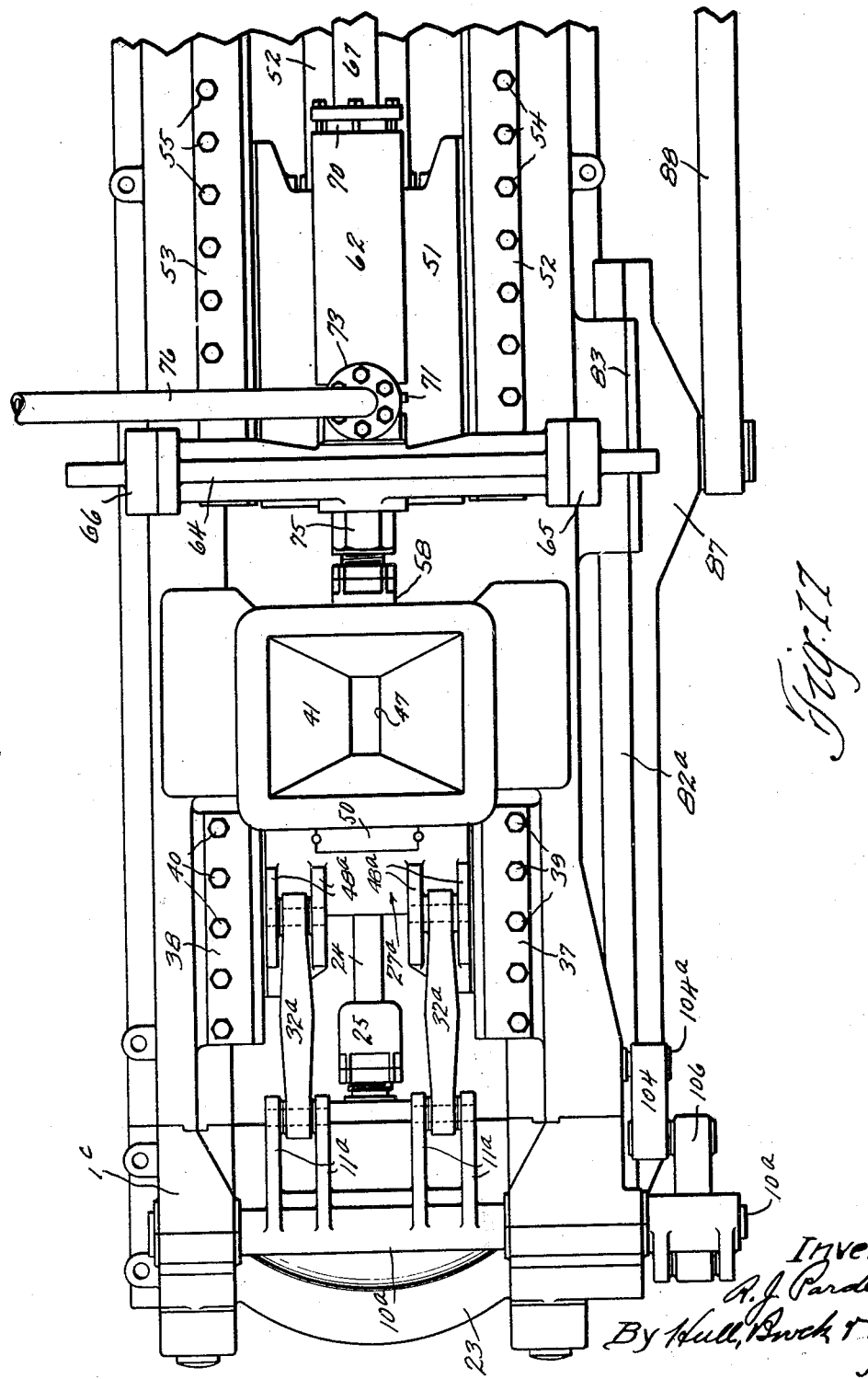

March 8, 1932. R. J. PARDEE 1,849,027
BRIQUETTING MACHINE
Filed March 27, 1931 17 Sheets-Sheet 17

Inventor
R. J. Pardee
By Hull, Brock & West
Attys.

Patented Mar. 8, 1932

1,849,027

UNITED STATES PATENT OFFICE

ROBERT J. PARDEE, OF CLEVELAND HEIGHTS, OHIO, ASSIGNOR TO THE CLEVELAND PUNCH & SHEAR WORKS COMPANY, OF CLEVELAND, OHIO, A CORPORATION OF OHIO

BRIQUETTING MACHINE

Application filed March 27, 1931. Serial No. 525,667.

This invention relates to a briquetting machine or press which is mechanically operated and in which both the plunger and mold casing are given a reciprocatory motion and are each actuated from a single drive shaft.

One of the objects of the invention is to provide a briquetting press in which the number of parts is reduced to a minimum and in which each briquette is formed under substantially the same pressure.

Another object of the invention is to provide a briquetting press which will operate at maximum efficiency and in which the wear of the tools is reduced to a minimum.

Another object of the invention is to provide a briquetting press in which the mold is not moved until the pressure on the briquette is relieved, thus minimizing the wear on the stripper slide or mold.

A further object of the invention is to provide a machine of the character described in which there is a yieldable connection between the plunger and its driving means so arranged that the briquettes are all formed under substantially the same pressure.

Figure 3:
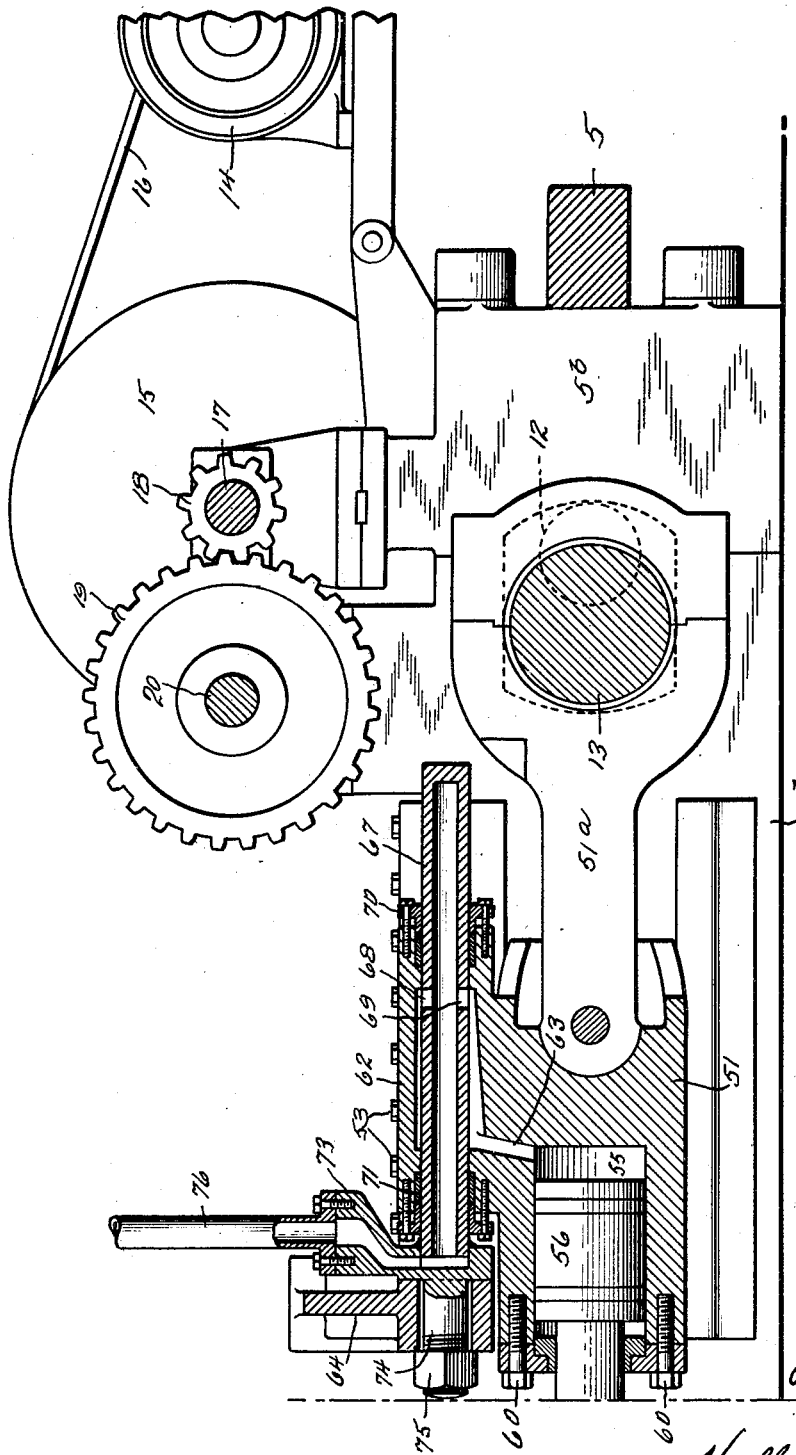
Figure 4:
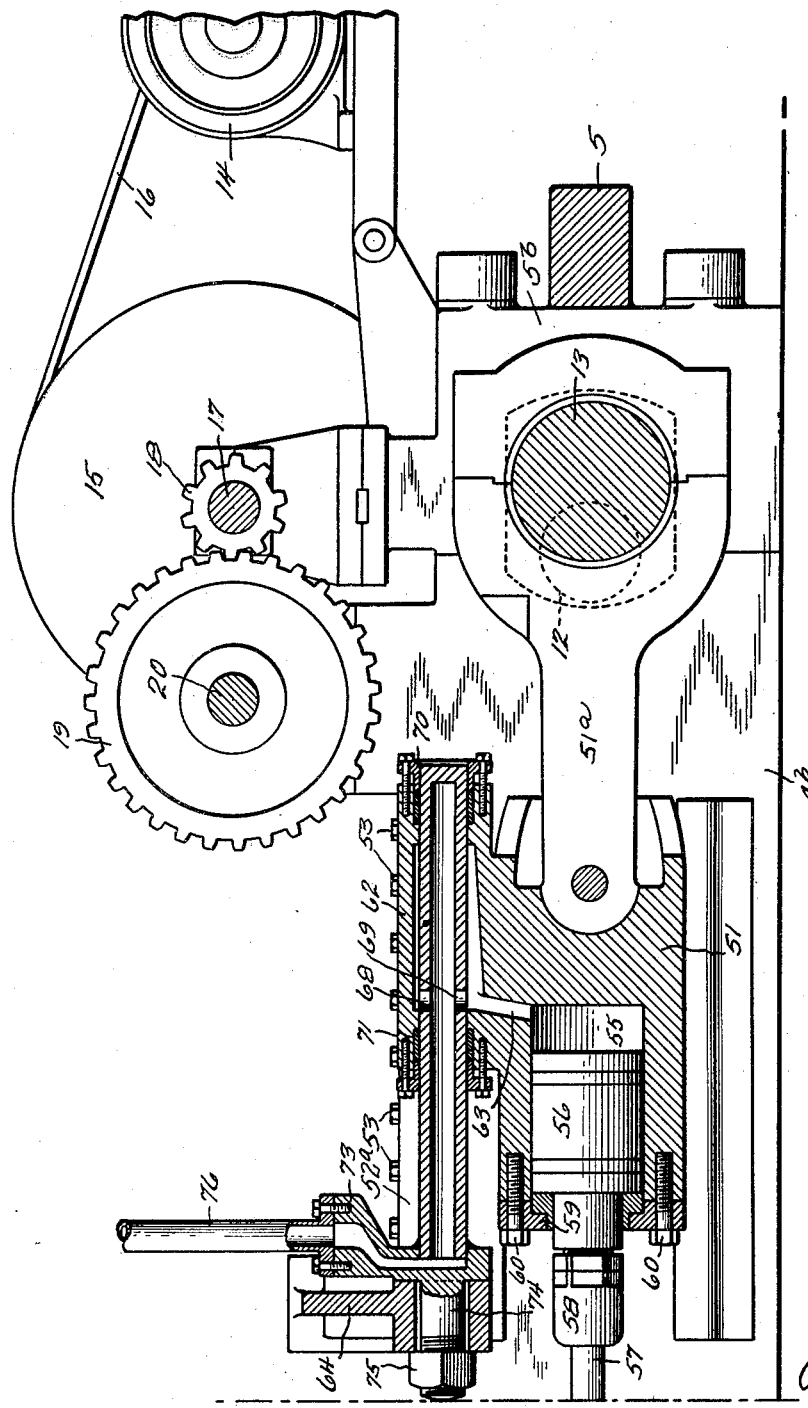
Figure 4A:
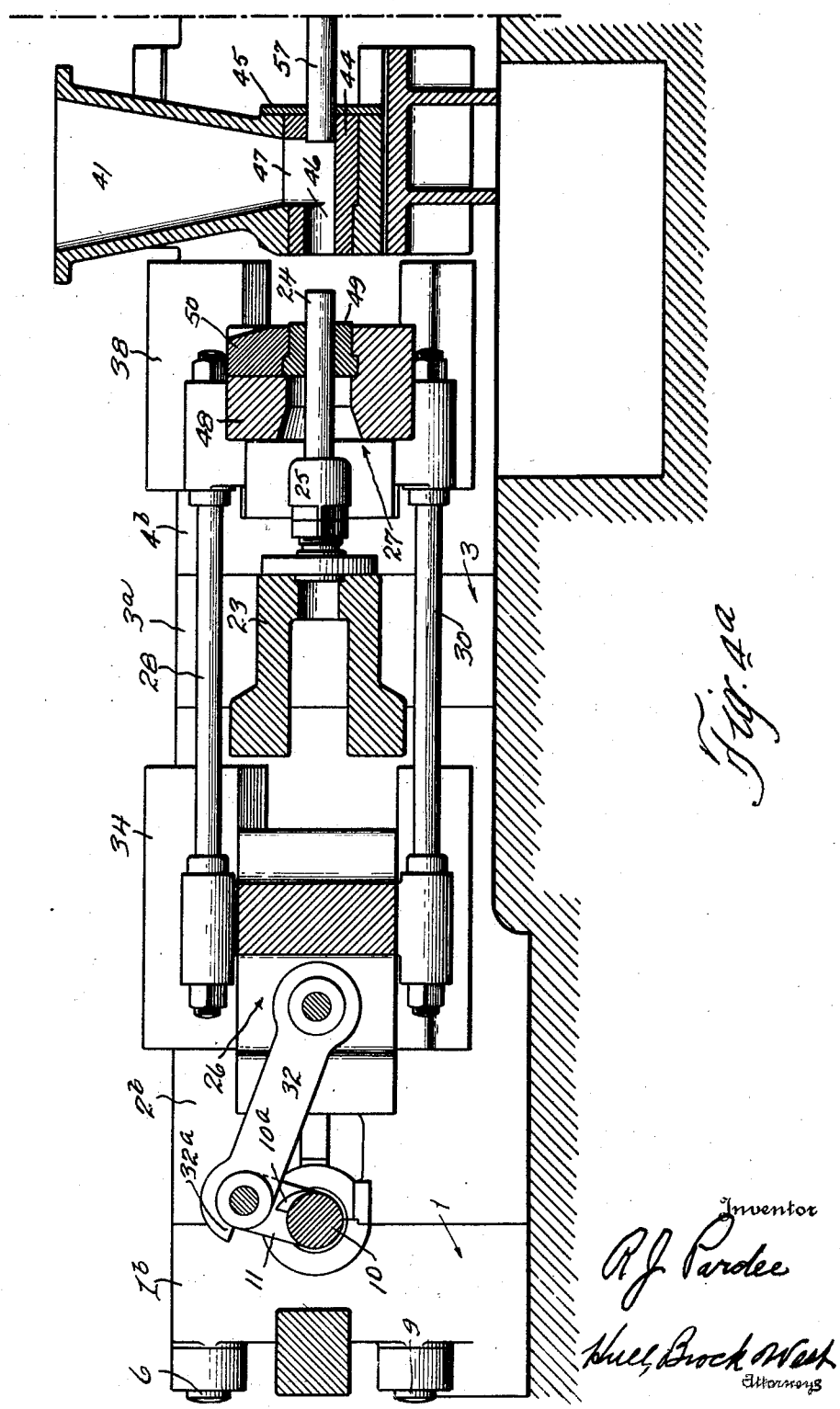
Figure 8:
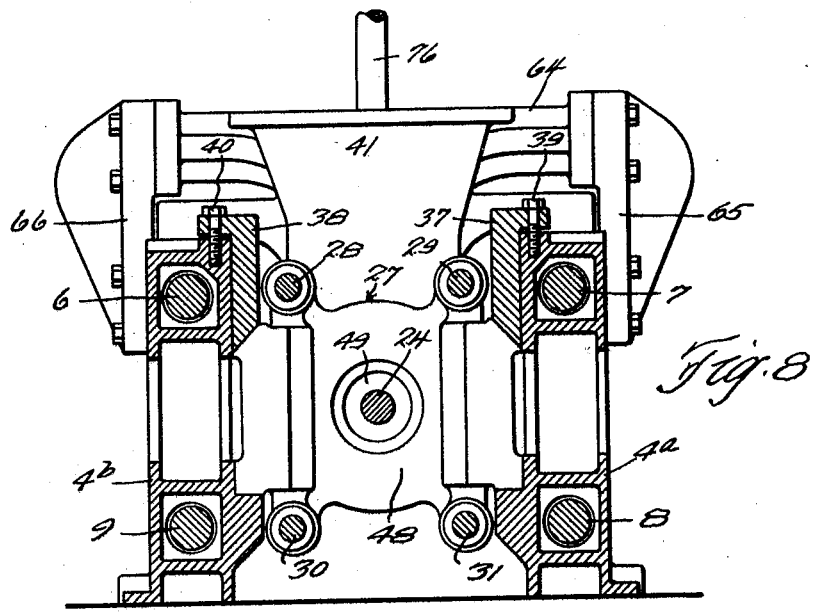
Figure 9:
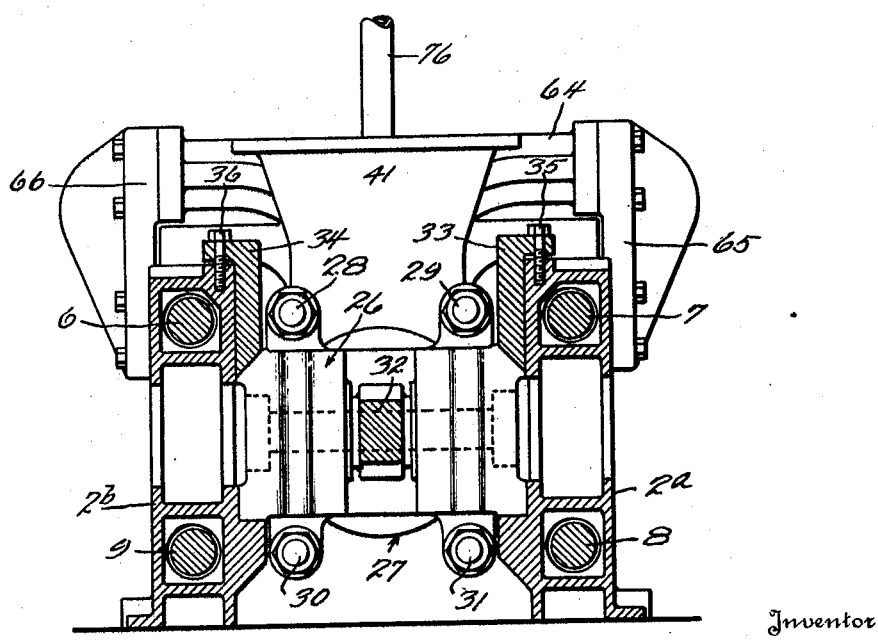
Figure 10:
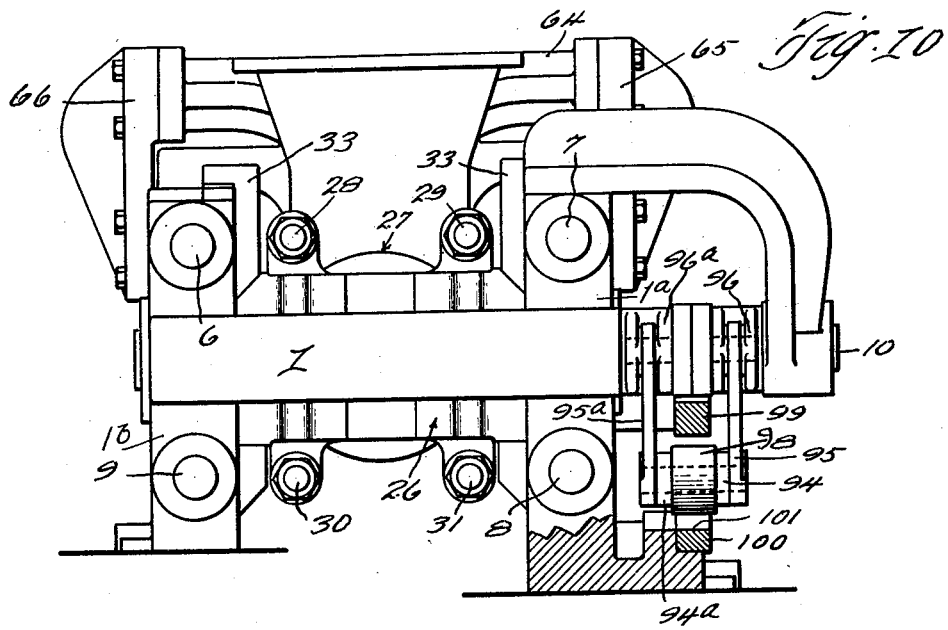
Figure 11:
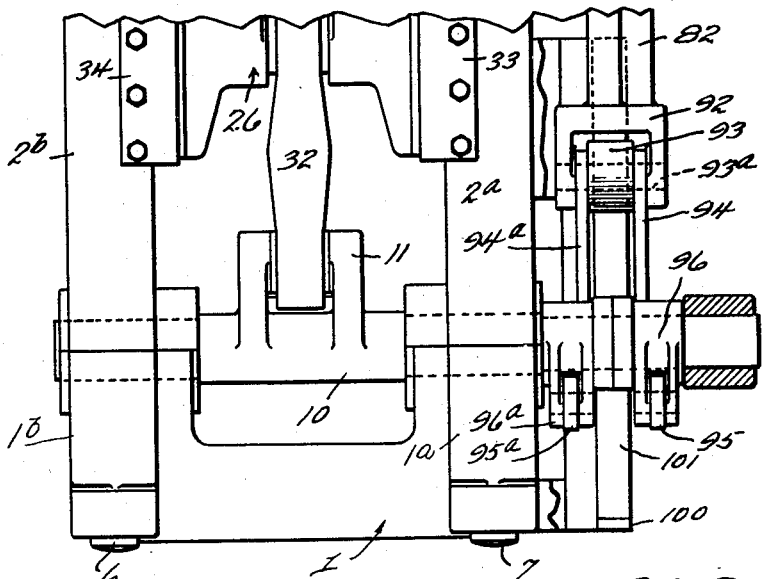
Figure 18:
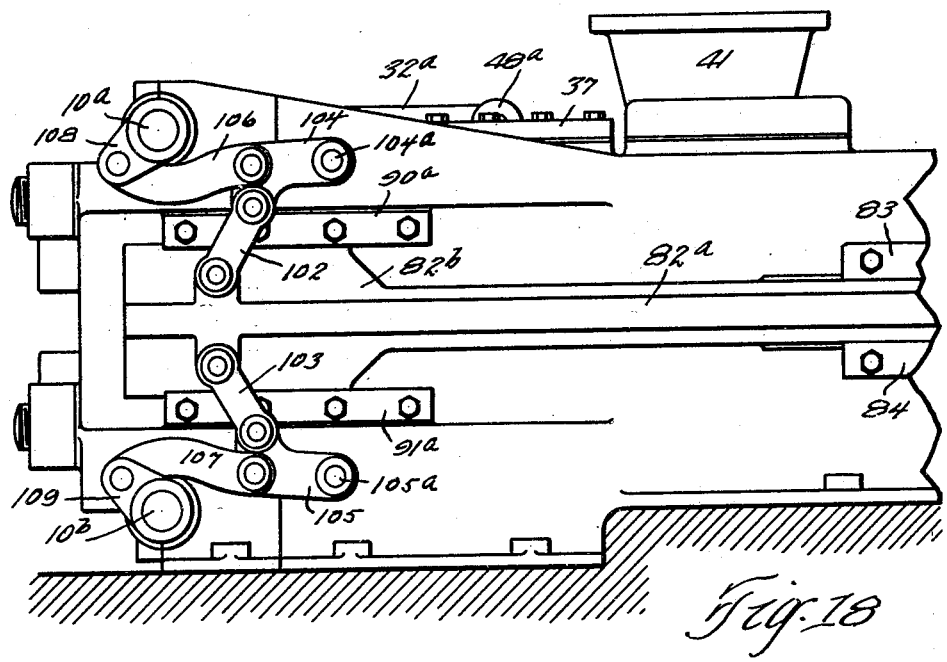
Figure 19:
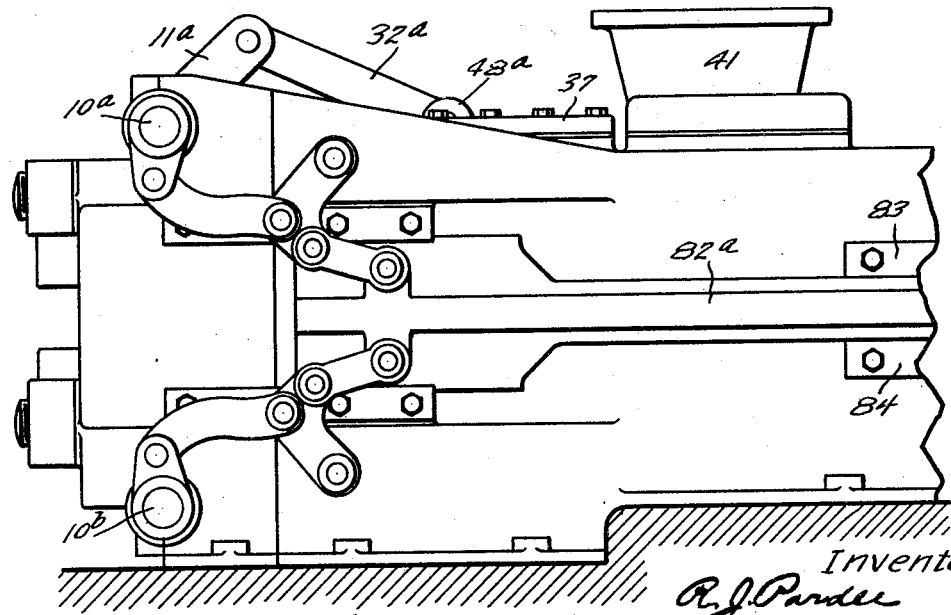
Figure 70:
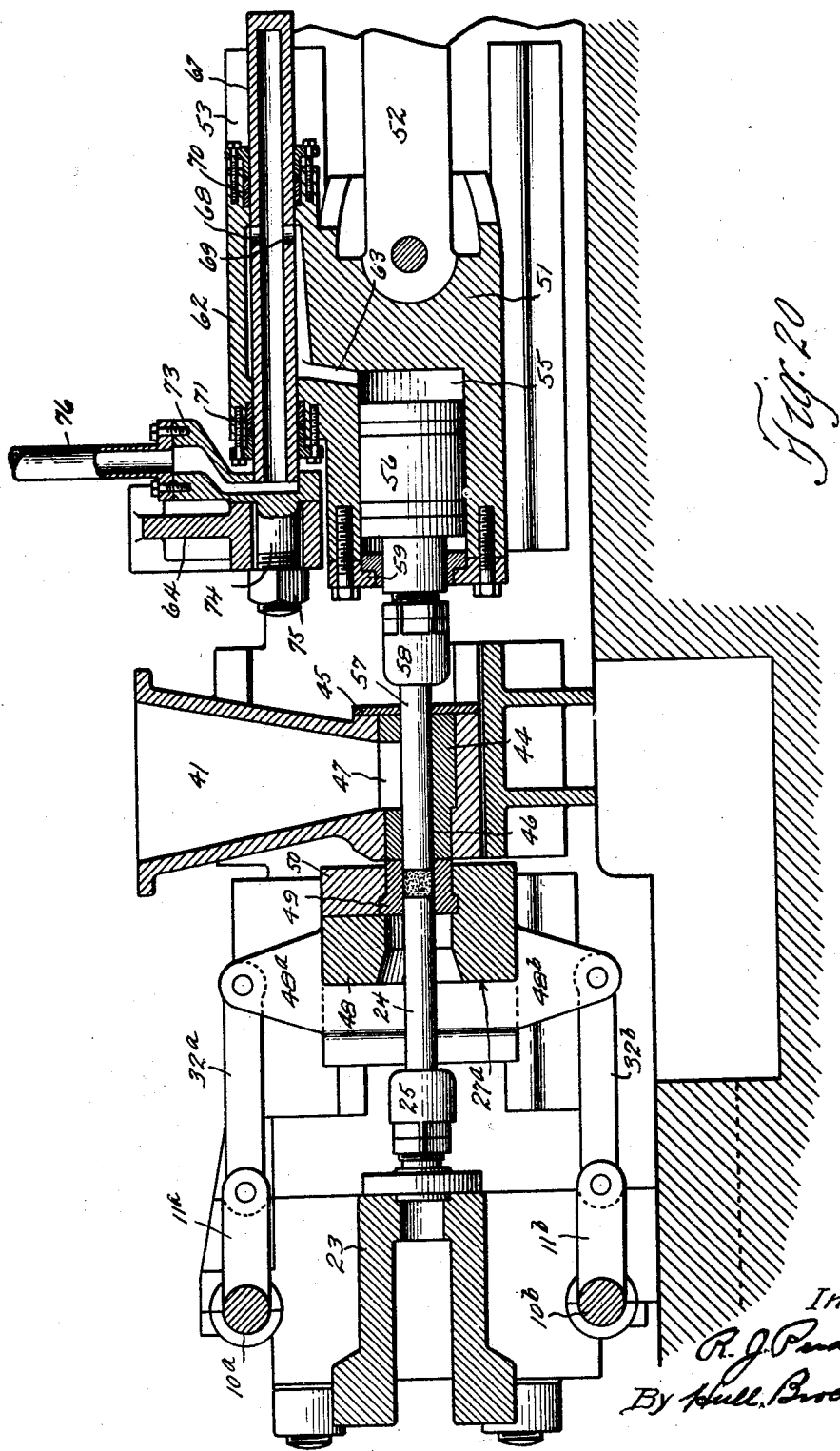

Further and more limited objects of the invention will appear as the description proceeds and by reference to the accompanying drawings, in which Figs. 1 and 1ª show a side elevation of the machine; Figs. 2 and 2ª show a plan view of the machine, the parts being in the position shown in Fig. 1; Figs. 3 and 3ª show a central vertical section through the machine showing the parts in the position they assume at the end of the compression or briquetting stroke; Figs. 4 and 4ª are views similar to Figs. 3 and 3ª, Fig. 4 showing the plunger mechanism in the furthest retracted position and Fig. 4ª showing the stripper slide and operating mechanism in its furthest retracted position; Fig. 5 is a side elevation of the rear end of the machine showing the parts at the limit of their movement in one position; Fig. 6 is a similar view showing the parts at the limit of their movement in the opposite direction; Fig. 7 is a transverse sectional view taken substantially on the line 7—7 of Fig. 2 and looking in the direction of the arrows; Figs. 8 and 9 are transverse sectional views taken on the lines 8—8 and 9—9 respectively of Fig. 2ª; Fig. 10 is a sectional rear elevation of the machine; Fig. 11 is a sectional plan of the rear end of the machine, the parts being in the same position as shown in Fig. 10; Figs. 12–15 inclusive are diagrammatic views showing the position of the various parts during different stages of the cycle of operation: Fig. 12 showing the plunger in the position which it assumes just after the completion of the briquetting stroke, the stripper slide mechanism being in the position just ready to start its rearward movement; Fig. 13 showing the parts in their relative positions when the stripper slide is at the limit of its rearward stroke, the plunger not having yet completed its rearward stroke; Fig. 14 showing the parts in their relative positions they assume when the stripper slide has just completed its forward stroke, the plunger having just started on its forward stroke; Fig. 15 showing the relative positions of the different parts with the plunger at the end of its forward stroke and the stripper slide mechanism in a position causing the stripper slide to dwell; Figs. 16 to 20 inclusive illustrate a modified form of my apparatus; Fig. 16 being a view in side elevation with the mold in the same relative position as shown in Figs. 1 and 1ª; Fig 17 a plan view of Fig. 16; Fig. 18 a fragmentary view in side elevation disclosing the mechanism for operating the stripper slide with the mold in the dwelling position; Fig. 19 a view similar to Fig. 18 showing the parts in the position which they will assume when the mold has been fully retracted; Fig. 20 a sectional view showing the parts in the position which they assume upon the completion of the briquetting stroke.

By reference to the accompanying drawings, especially Figs. 1, 1ª, 2, 2ª, 3, 3ª and 4, 4ª, it will be seen that the machine consists of five frame members 1, 2, 3, 4 and 5. The frame members 1, 3 and 5 are each made in one piece and consist of side frame members which are designated 1ª, 1ᵇ, 3ª, 3ᵇ, and 5ª, 5ᵇ, respectively. The frame members 2 and 4 are each made in two pieces which are designated by the reference characters 2ª, 2ᵇ, and 4ª, 4ᵇ, respectively. The frame members are fitted together as shown and are rigidly secured in place by tie rods 6, 7, 8 and 9 which extend through the frame members as shown and are threaded at their outer ends to receive suitable nuts adapted to be tightened to secure the frame members together. For convenience of description, the part of the machine toward the right, as seen in Figs. 1 and 4ª, will be referred to as the front of the machine, and the part toward the left as seen in those figures as the rear of the machine.

Journaled in the rear end of the machine and mounted in suitable bearings is a crank shaft 10 which is disposed between the frame member 1 and the frame members 2 and 2ª. The crank shaft 10 is provided with a crank 11 the purpose of which will hereinafter appear. Journaled between the frame member 5 and the frame members 4ª and 4ᵇ is a drive shaft 12 having a crank portion 13 the purpose of which will also appear hereinafter.

Supported on the machine in any suitable manner is an electric motor 14 which drives a pulley 15 through the medium of a belt 16. The pulley 15 is rotatably secured on a shaft 17 and adapted to be clutched to the shaft by means of a clutch 17ª. Carried by the shaft 17 is a small gear 18 which meshes with a larger gear 19 carried by a shaft 20. Carried by the opposite end of the shaft 20 is a small gear 21 which meshes with and drives the large gear 22 keyed on the shaft 12. The crank shaft 10 is driven from the drive shaft 12 in a manner to be hereinafter more fully described. The frame member 3 is preferably formed of one piece and has a centrally disposed horizontally extending web portion 23 which extends across the machine and which receives and supports the mold block 24 which is detachably and adjustably connected therewith by means of an adjustable connecting member 25. The mold block extends forwardly from the frame member 2, as shown most clearly in Figs. 3ª and 4ª. Carried by the frame members 2ª and 2ᵇ and slidably mounted in the rear of the web portion 23 thereof is the rear slide 26. Carried by the frame members 4ª and 4ᵇ in front of the web portion 23 is the front or stripper slide 27. The slides 26 and 27 are connected by tie rods 28, 29, 30 and 31 which extend through apertured lugs provided on the slides respectively. The rear slide 26 is connected with the crank 11 by means of a link 32 which has one end pivotally secured to the slide 26 and its opposite end pivotally secured to the crank 11. The rear slide 26 is shaped as shown most clearly in Fig. 10 and is held in place by means of clamps 33 and 34 which are secured to the frame members 2ª and 2ᵇ by means of bolts 35 and 36. The front or stripper slide 27 is shaped as shown most clearly in Fig. 8 and is held in place by means of clamps 37 and 38 secured to the frame members 4ª and 4ᵇ by means of bolts 39 and 40. It will thus be seen that the front and rear slides 26 and 27 have a fixed stroke and are driven from the crank shaft 10. Carried by the frame members 4ª and 4ᵇ is a hopper 41 which is secured thereto by means of bolts 42 and 43. The lower end of the hopper is provided with a longitudinally extending bore or opening in which is arranged a block 44 having a shoulder thereon and secured in place by means of a clamping plate 45. Extending through the block 44 is a bore or passageway 46 which is disposed in alignment with the mold block 24. Connecting the bore 46 with the interior of the hopper is a bore or passage 47. The front slide 27 is provided with a body portion 48 having an opening therein into which projects the end of the mold block 24. Carried by the body portion 48 of the stripper slide and removably secured thereto is a mold or forming die 49 which is provided with an annular shoulder and held in place by a block 50 detachably secured to the stripper slide. The forming die 49 and the block 44, which is arranged within the hopper 41, are machined and formed of case hardened steel, and the parts are so positioned that the openings in the die 49 and block 44 are disposed in axial alignment. Also carried by the frame members 4ª and 4ᵇ is a cylinder slide 51 which is slidably mounted upon suitable supports provided on the frame members. The cylinder slide is held in place by means of clamps 52, 52ª which are secured to the frame members by means of bolts 53 and 54. The cylinder slide 51 is connected with the crank 13 by means of a connecting rod 51ª pivotally secured to the crank at one end and to the cylinder slide at its opposite end. It will thus be seen that the cylinder slide has a definite and fixed stroke and is operated directly from the drive shaft 12. The cylinder slide 51 is provided with a cylindrical opening 55 in which is arranged a piston 56 to which is rigidly connected a plunger 57 which is connected with the piston by means of an adjustable connection 58. The parts are so arranged that the plunger 57 is disposed in axial alignment with the bore 46 and the mold block 24. The outer end of the cylindrical opening 55 is closed by means of a clamping plate 59 held in place by means of suitable bolts 60. The cylinder slide 51 is provided with an upstanding portion 62 which is hollow and connected with the cylinder by means of a bore or passageway 63.

Extending transversely of the frame members 4ª and 4ᵇ is a supporting member 64 which is secured to the frame members by means of brackets 65 and 66. Disposed within the hollow portion 62 of the cylinder slide is a tubular member 67 having ports 68 and 69 therein. One end of the tubular member 67 is secured to a connection 73 having a projecting portion 74 which projects through an opening provided in the supporting member 64 and is secured thereto by means of a nut 75. Leading from the connection 73 is a rigid tubular connection 76 which connects with an accumulator 77 from which leads a connection 78 connecting with a pressure tank 79. The connection 76 is provided with a valve 80 and a pressure indicator 81. The opening in the supporting member 64 through which the projection 74 extends is somewhat larger than the projection 74 so that the nut 75 may be tightened to correct disalignment between the cylinder slide and the tubular member 67. Suitable packing glands 70 and 71, around the tubular member 67, are provided in opposite ends of the hollow portion 62. From the construction of the connections just described, it will be seen that the cylinder 51 is at all times in open communication with the accumulator 77. Due to the high pressure obtained in the accumulator and in the cylinder 51, it becomes necessary to provide a non-flexible connection between the cylinder and the accumulator and the connections just described were designed with that end in view. Should there be any wear of the cylinder slide bearings, the nut 75 may be loosened to permit the cylinder member 67 to align itself. The nut may then be tightened to secure the parts in proper position. The details of these connections are claimed in my co-pending application Serial No. 577,071, filed Nov. 24, 1931.

Extending lengthwise longitudinally of the machine is a reciprocating slide 82 which is shaped in section, as shown most clearly in Fig. 7. The front end of the reciprocating slide 82 is slidably connected with the frame member 4$^a$ and is held in place by clamping plates 83 and 84 secured to the frame member 4$^a$ by means of bolts 85 and 86. The reciprocating slide 82 is also provided with an outwardly projecting portion 87 to which is connected one end of a connecting rod 88 the opposite end of which is connected to a crank pin 89 on the gear 22. The opposite end of the reciprocating slide 82 has a slidable bearing in the frame 2$^a$ and is held in place by clamping plates 90 and 91 secured to the frame 2$^a$ by suitable bolts. The rear end of the reciprocating slide 82 is provided with a head portion 92 in which is mounted a roller 93 held in place by a pin 93$^a$. Connected with the pin 93$^a$ are a pair of links 94 and 94$^a$. Connected with the opposite ends of the links 94 and 94$^a$ are floating links 95 and 95$^a$ the opposite ends of which connect with cranks 96 and 96$^a$ which are keyed to the crank shaft 10. The links 94, 94$^a$ and 95, 95$^a$ are connected by means of a pin 97 on which is mounted a roller 98. Carried by the frame members 1 and 2$^a$ are a pair of guide bars 99 and 100 which are secured in place by suitable bolts. The lower guide bar 100 is provided with a curved surface 101 the purpose of which will appear hereinafter. The curved surface 101 is an arc of a circle described with the point A as a center with the parts in the position shown in Figs. 1$^a$, 6, 12, 14 and 15. It will thus be seen that the connections between the reciprocating slide and the crank shaft 10 comprise links having their front ends pivotally connected with the slide, and cranks having one end non-rotatably connected with the crank shaft, and floating links having one end connected with the other end of the cranks and their opposite ends pivotally connected to the first links, whereby to cause the mold to dwell as desired.

Operation

In the ordinary operation of this machine a predetermined pressure is supplied to the air pressure chamber 79 which in turn exerts a predetermined pressure upon the accumulator 77 and the cylinder 51 when the valves in the connection 76 are opened. When the motor 14 is started, the drive shaft 12 will be rotated. This rotary motion of the drive shaft will reciprocate the slide 82 through the medium of the crank 89 and connecting rod 88. The cylinder slide 51 will also be driven from the drive shaft 12 and will have a definite and fixed stroke. The material to be briquetted is contained in the hopper 41. With the parts in the position shown in Fig. 12, the plunger 57 is in the position which it assumes just after the completion of the briquetting stroke, the stripper slide and mold being in the position just ready to start its rearward movement. Fig. 13 shows the parts in the position which they assume when the stripper slide and mold is at the limit of its rearward stroke, the plunger 57 not having yet completed its rearward stroke. In Fig. 14 the parts are shown in the position which they assume when the stripper slide and mold has just completed its forward stroke, the plunger having just started its forward stroke. Fig. 15 shows the parts in the position which they assume with the plunger at the end of its forward stroke and the mold and stripper slide operating mechanism in position to cause the mold to dwell.

Starting with the parts in the position shown in Fig. 12, upon further movement of the drive shaft, the mold starts its rearward movement (see Fig. 5). During the movement of the mold from its forward to its rear position, the connections between the reciprocating slide 82 and the crank shaft 10 move from the position shown in Figs. 1$^a$ and 12 to the position shown in Figs. 5 and 13. Further movement of the drive shaft causes the stripper slide and mold to immediately move back to its forward position, as shown in Fig. 14, and the connections between the slide 82 and crank shaft 10 move back to the position shown in Figs. 1$^a$, 12 and 14. Further movement of the drive shaft 12 causes the slide 82 and parts connecting it to the crank shaft 10 to move to the position shown in Fig. 6 and back to the position shown in Figs. 1ª, 12 and 14. During this last mentioned movement the crank shaft 10, stripper slide 26 and mold 49 and connecting part remain stationary or dwell. This dwell of the shaft 10 and mechanism connecting it to the stripper slide is due to the roller 98 rolling along the curved surface 101, which, as hereinbefore stated, is the arc of a circle swung about the point A, the center of the connection between the links 95 and 95ª and the cranks 96 and 96ª, as a center. While the mold is dwelling or stationary, the cylinder slide 51 and with it the piston 56 and plunger 57 move to the position shown in Figs. 3 and 3ª to compress the material into a briquette, the mold serving to form the briquette. The pressure within the cylinder 55 and behind the piston 56 is the same as the pressure in the accumulator. When the pressure of the plunger against the briquette exceeds the pressure behind the piston 56, the piston moves within the cylinder to the position shown in Figs. 3 and 15. The cylinder slide always has a fixed and positive stroke and the parts are so proportioned that in normal operation the pressure of the plunger against the mold block normally exceeds the pressure behind the piston 56 so that the cylinder always moves forward with respect to the piston and plunger. Upon rearward movement of the plunger, the cylinder slide first moves with respect to the piston 56 until it strikes the piston whereupon the piston and plunger move together to the rear end of the stroke. As the plunger is moved rearward, the mold is also moved rearward until it reaches the rear end of its stroke (see Figs. 4ª and 13), the plunger not having yet completed its rearward stroke. As the mold is moved to the position shown in Fig. 13, the briquette drops off the mold block by gravity or, if desired, means may be provided for dislodging the briquette. The stripper slide and mold are then moved from the position shown in Fig. 13 to the position shown in Fig. 14 whereupon it dwells until the plunger is moved to the positon shown in Fig. 15. It will thus be seen that the mold or stripper slide moves to its forward position and dwells until the plunger completes its forward stroke and starts upon its rearward stroke. In the normal operation of the machine the cylinder slide moves rearward a short distance before it engages the piston to move it to its rearward position because at the forward end of the stroke of the cylinder slide the pressure on the plunger is slightly in excess of that behind the piston 56 with the result that each briquette is formed under substantially the same pressure. It is also to be noted that the link 32 is provided with a lug 32ª which is engaged by a lug 10ª formed on the crank 10 to prevent the crank from moving past center and causing a return movement of the mold. Attention is also called to the fact that the mold block 24 is stationary and has no movement whatever.

In Figs. 16 to 20 inclusive there is disclosed a modified form of my briquetting press in which the size of the machine and the number of parts are materially reduced. In this form of the machine the frame members 1, 2 and 3 are replaced by an end frame member 1ᶜ in which is journaled a pair of crank shafts 10ª and 10ᵇ arranged one above the other as disclosed in Fig. 20. The crank shafts 10ª and 10ᵇ are provided with crank portions 11ª and 11ᵇ, respectively, which are pivotally connected with links 32ª and 32ᵇ the opposite ends of which are pivotally connected with projections 48ª and 48ᵇ on the mold slide 27ª. The reciprocating slide 82 is replaced by a shorter reciprocating slide 82ª. The rear end of the reciprocating slide 82 is slightly enlarged as shown at 82ᵇ and is slidably secured to the frame members by means of gibs or clamps 90ª and 91ª which are secured in place by suitable bolts. Pivotally secured to the rear end portion of the reciprocating slide 82ª are links 102 and 103 to which are pivotally secured bell cranks 104 and 105 which are pivotally secured to the frame members at 104ª and 105ª. Links 106 and 107 connect the bell cranks 104 and 105 with cranks 108 and 109 which are non rotatably secured to the crank shafts 10ª and 10ᵇ, respectively. In this form of the apparatus the movement of the plunger and mold is the same as in the form of apparatus disclosed in Figs. 1 to 15 inclusive. The connections between the reciprocating slide 82ª and the crank shafts 10ª and 10ᵇ are such that the mold is caused to dwell at the proper time.

In Fig. 16 the parts are shown in the position which they assume just as the mold starts to dwell. The mold dwells until the parts move from the position shown in Fig. 16 to the position shown in Fig. 18 and back to the position shown in Fig. 16. As the mold is retracted, the parts move from the position shown in Fig. 16 to the position shown in Fig. 19 and on the forward stroke of the mold the parts move from the position shown in Fig. 19 to the position shown in Fig. 16. In Fig. 20 the parts are shown in the position which they assume at the completion of the compression or brick forming stroke.

It will be seen that the dissipation of the movement between the slide 82ª and the crank shafts 10ª and 10ᵇ is caused by the toggle action of the links and cranks forming the connection. It will also be seen that no movement is imparted to the shafts 10ª and 10ᵇ while the reciprocating slide 82ª and its associated parts are moving from the position shown in Fig. 16 to the position shown in Fig. 18 and back to the position shown in Fig. 16. In other respects, this form of the invention is identical with that shown in Figs. 1 to 15 inclusive. In this form of the apparatus the whole machine is materially shortened and more positive action is obtained.

It is to be understood that the forms of the invention herein disclosed are merely illustrative and are not to be considered in a limiting sense as the invention is limited only in accordance with the scope of the appended claims as numerous changes may be made in the construction and the mechanical constructions without departing from the spirit of the invention.

Having thus described my invention, what I claim is:

1. In a briquetting machine, the combination of a mold block, a reciprocating plunger, a mold having a fixed stroke with respect to the mold block, a drive shaft, operative connections between said drive shaft and said plunger, a crank shaft, unyieldable operative connections between said crank shaft and said mold, and operative connections between said drive shaft and said crank shaft.

2. In a briquetting machine, the combination of a mold block, a reciprocating plunger, a mold having a fixed stroke with respect to the mold block, a drive shaft, operative connections between said drive shaft and said plunger, a crank shaft, unyieldable operative connections between said crank shaft and said mold, and operative connections between said drive shaft and said crank shaft, said last mentioned connections including means for causing said mold to dwell.

3. In a briquetting machine, the combination of a mold block, a reciprocating plunger, a mold having a fixed stroke with respect to the mold block, a drive shaft, operative connections between said drive shaft and said plunger, a crank shaft, unyieldable operative connections between said crank shaft and said mold, operative connections between said drive shaft and said crank shaft, said last mentioned connections including means for causing said mold to dwell, said means including a plurality of links pivotally connected, and means for controlling the relative position of said links.

4. In a briquetting machine, the combination of a mold block, a reciprocating plunger, a mold movable with respect to the mold block, a drive shaft, operative connections between said drive shaft and said plunger, a crank shaft, operative connections between said crank shaft and said mold and operative connections between said drive shaft and said crank shaft, said last mentioned connections including means for causing said mold to dwell, said means including a plurality of links pivotally connected, and means for controlling the relative position of said links, said last mentioned means including a curved surface so disposed as to determine the path of travel of said links.

5. In a briquetting machine, the combination of a mold block, a reciprocating plunger, a mold movable with respect to the mold block, a drive shaft, operative connections between said drive shaft and said plunger, a crank shaft, operative connections between said crank shaft and said mold and operative connections between said drive shaft and said crank shaft, said last mentioned connections comprising a crank connected with said drive shaft, a reciprocating slide connected with said crank, a plurality of links pivotally connected with each other and with said slide, a curved surface for regulating the path of movement of one of said links and effecting the driving connection between said slide and said crank shaft.

6. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, the connections between said crank shaft and said mold comprising a mold slide made up of a pair of sections rigidly connected together, means rigidly connecting said mold with said mold slide, and means forming a pivotal connection between said crank shaft and said mold slide.

7. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, the connections between said crank shaft and said mold comprising a mold slide made up of a pair of sections rigidly connected together, means rigidly connecting said mold with said mold slide, and means forming a pivotal connection between said crank shaft and said mold slide, said mold block being stationary and disposed between the two sections of said mold slide.

8. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, the connections between said drive shaft and said crank shaft including a plurality of links, and means for regulating the movement of said links to cause said mold to dwell.

9. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, the connections between said crank shaft and said mold comprising a mold slide made up of a pair of sections rigidly connected together, means rigidly connecting said mold with said mold slide, and means forming a pivotal connection between said crank shaft and said mold slide, the connection between said crank shaft and said mold slide comprising a pair of links the opposite ends of which are pivotally secured to said crank shaft and said mold slide respectively and the adjacent ends of which are pivotally secured to each other.

10. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, and operative connections between said drive shaft and said crank shaft, a hopper disposed between said mold block and said plunger and having a block detachably secured therein, said block having an opening extending therethrough and disposed in alignment with said mold block and said plunger.

11. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, and operative connections between said drive shaft and said crank shaft, a hopper disposed between said mold block and said plunger and having a block detachably secured therein, said block having an opening extending therethrough and disposed in alignment with said mold block and said plunger, a forming die detachably secured in said mold and having an opening extending therethrough and disposed in alignment with said plunger.

12. In a briquetting machine, the combination of a mold block, a reciprocating plunger, a mold having a fixed stroke with respect to the mold block, a drive shaft, operative connections between said drive shaft and said plunger, a crank shaft, unyieldable operative connections between said crank shaft and said mold, and operative connections between said drive shaft and said crank shaft, said last mentioned connections comprising a crank connected with said drive shaft, a reciprocating slide connected with said crank, a plurality of links pivotally connected with each other and with said slide, a curved surface for regulating the path of movement of one of said links and effecting the driving connection between said slide and said crank shaft.

13. In a briquetting machine, the combination of a mold block, a reciprocating plunger, a mold having a fixed stroke with respect to the mold block, a drive shaft, operative connections between said drive shaft and said plunger, a crank shaft, unyieldable operative connections between said crank shaft and said mold, operative connections between said drive shaft and said crank shaft, the connections between said crank shaft and said mold comprising a mold slide made up of a pair of sections rigidly connected together, means rigidly connecting said mold with said mold slide, and means forming a pivotal connection between said crank shaft and said mold slide.

14. In a briquetting machine, the combination of a mold block, a reciprocating plunger, a mold having a fixed stroke with respect to the mold block, a drive shaft, operative connections between said drive shaft and said plunger, a crank shaft, unyieldable operative connections between said crank shaft and said mold and operative connections between said drive shaft and said crank shaft, said mold block being stationary and disposed between the two sections of said mold slide.

15. In a briquetting machine, the combination of a mold block, a reciprocating plunger, a mold having a fixed stroke with respect to the mold block, a drive shaft, operative connections between said drive shaft and said plunger, a crank shaft, unyieldable operative connections between said crank shaft and said mold, operative conections between said drive shaft and said crank shaft, the connections between said drive shaft and said crank shaft including a plurality of links, and means for regulating the movement of said links to cause said mold to dwell.

16. In a briquetting machine, the combination of a mold block, a reciprocating plunger, a mold having a fixed stroke with respect to the mold block, a drive shaft, operative connections between said drive shaft and said plunger, a crank shaft, unyieldable operative connections between said crank shaft and said mold, operative connections between said drive shaft and said crank shaft, and means holding said mold block against movement with respect to the mold and plunger.

17. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, and operative connections between said drive shaft and said crank shaft, said last mentioned connections comprising a crank connected with said drive shaft, a reciprocating slide connected with said crank, connections between said slide and said crank shaft comprising a link having one end pivotally connected with said slide, a crank having one end non-rotatably connected with said crank shaft, a floating link having one end pivotally connected with the other end of said crank and its opposite end pivotally connected to said first link, a curved surface disposed so as to regulate the path of movement of said floating link, said floating link having a roller adapted to engage said curved surface whereby to dissipate the movement of said slide and to cause said mold to dwell.

18. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, and operative connections between said drive shaft and said crank shaft, said mold block, plunger and mold being disposed between said drive shaft and said crank shaft.

19. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, and operative connections between said drive shaft and said crank shaft, the operative connections between said drive shaft and plunger comprising a cylinder surrounding said plunger and movable with respect thereto.

20. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, the operative connections between said drive shaft and plunger comprising a cylinder surrounding said plunger and movable with respect thereto, and means for imparting a fixed stroke to said cylinder.

21. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, the operative connections between said drive shaft and plunger comprising a cylinder surrounding said plunger and movable with respect thereto, and hydraulic cushioning means disposed between said plunger and cylinder adapted to yield when the pressure on said plunger exceeds a predetermined value.

22. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, the operative connections between said drive shaft and plunger comprising a cylinder surrounding said plunger and movable with respect thereto, means for imparting a fixed stroke to said cylinder, an accumulator connected with the interior of said cylinder, and an unyieldable connection between said cylinder and accumulator.

23. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, the operative connections between said drive shaft and plunger comprising a cylinder surrounding said plunger and movable with respect thereto, means for imparting a fixed stroke to said cylinder, an accumulator connected with the interior of said cylinder, and an unyieldable connection between said cylinder and accumulator, said unyieldable connection including a member extending through a portion of said cylinder and held against movement with respect thereto.

24. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, and operative connections between said drive shaft and said crank shaft, the operative connections between said drive shaft and plunger comprising a cylinder surrounding said plunger and movable with respect thereto, an accumulator connected with the interior of said cylinder and an unyieldable connection between said cylinder and accumulator.

25. In a briquetting machine, the combination of a mold block, a reciprocating plunger, a mold movable with respect to the mold block, a drive shaft, operative connections between said drive shaft and said plunger, a crank shaft, operative connections between said crank shaft and said mold and operative connections between said drive shaft and said crank shaft, said last mentioned connections including means for causing said mold to dwell, said means including a plurality of links pivotally connected, means for controlling the relative position of said links, said last mentioned means including a curved surface so disposed as to determine the path of travel of said links, and a yieldable connection between said drive shaft and said plunger.

26. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, the connections between said crank shaft and said mold comprising a mold slide made up of a pair of sections rigidly connected together, means rigidly connecting said mold with said mold slide, means forming a pivotal connection between said crank shaft and said mold slide, and a yieldable connection between said drive shaft and said plunger.

27. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, and operative connections between said drive shaft and said crank shaft, said mold block, plunger and mold being disposed between said drive shaft and said crank shaft, and a yieldable connection between said drive shaft and said plunger.

28. In a briquetting machine, the combination of a mold block, a reciprocating plunger, a mold movable with respect to the mold block, a drive shaft, operative connections between said drive shaft and said plunger, a crank shaft, operative connections between said crank shaft and said mold, operative connections between said drive shaft and said crank shaft, said last mentioned connections including means for causing said mold to dwell, said means including a plurality of links pivotally connected, means for controlling the relative position of said links, said last mentioned means including a curved surface so disposed as to determine the path of travel of said links, the connections between said drive shaft and plunger including a cylinder surrounding said plunger, and means for imparting a fixed stroke to said cylinder.

29. In a briquetting press, the combination of a mold block, a reciprocating plunger, a mold having a fixed stroke with respect to said mold block, a drive shaft, operative connections between said drive shaft and said plunger, a pair of crank shafts, unyieldable connections between said pair of crank shafts and said mold, and operative connections between said drive shaft and said pair of crank shafts for causing a dissipation of movement between said drive shaft and said pair of crank shafts.

In testimony whereof, I hereunto affix my signature.

ROBERT J. PARDEE.